United States Patent [19]

Medlock

[11] Patent Number: 4,565,013

[45] Date of Patent: Jan. 21, 1986

[54] GAUGE FOR MEASURING CLEARANCE IN THE BODY SIDE BEARINGS OF RAIL CARS

[76] Inventor: Wayne D. Medlock, 4942 Saddlerock Way, Sacramento, Calif. 95841

[21] Appl. No.: 685,868

[22] Filed: Dec. 24, 1984

[51] Int. Cl.[4] ............................ G01B 5/00; G01B 5/14
[52] U.S. Cl. .......................................... 33/517; 33/557
[58] Field of Search ................. 33/501, 517, 557, 571, 33/DIG. 17

[56] References Cited

U.S. PATENT DOCUMENTS

| | | | |
|---|---|---|---|
| 1,509,703 | 9/1924 | Bourgeois | 33/427 |
| 1,863,236 | 6/1932 | Brienza | 33/7 |
| 2,466,185 | 4/1949 | Stoothoff | 33/DIG. 17 |
| 3,158,941 | 12/1964 | Komstadius | 33/174 R |
| 4,321,754 | 3/1982 | Colby | 33/180 AT |

FOREIGN PATENT DOCUMENTS 242416 10/1969 U.S.S.R. ...................... 33/DIG. 17

*Primary Examiner*—Richard R. Stearns
*Attorney, Agent, or Firm*—Lothrop & West

[57] ABSTRACT

A gauge for measuring the clearance between the bottom surface of the body side bearings of a rail car and the subjacent top surface of the respective truck side bearing rollers includes a central vertical frame and a horizontal cross beam carrying on each of its outer extremities a vertically movable graduated blade. Telescoping arms on opposite ends of the cross beam enable the gauge to be used on different kinds and sizes of rail cars and cabooses; and a missing side bearing adapter is provided so that gauging can proceed even though either or both of the side bearings are missing. For truck plant and body plant use special indicia are provided.

8 Claims, 16 Drawing Figures

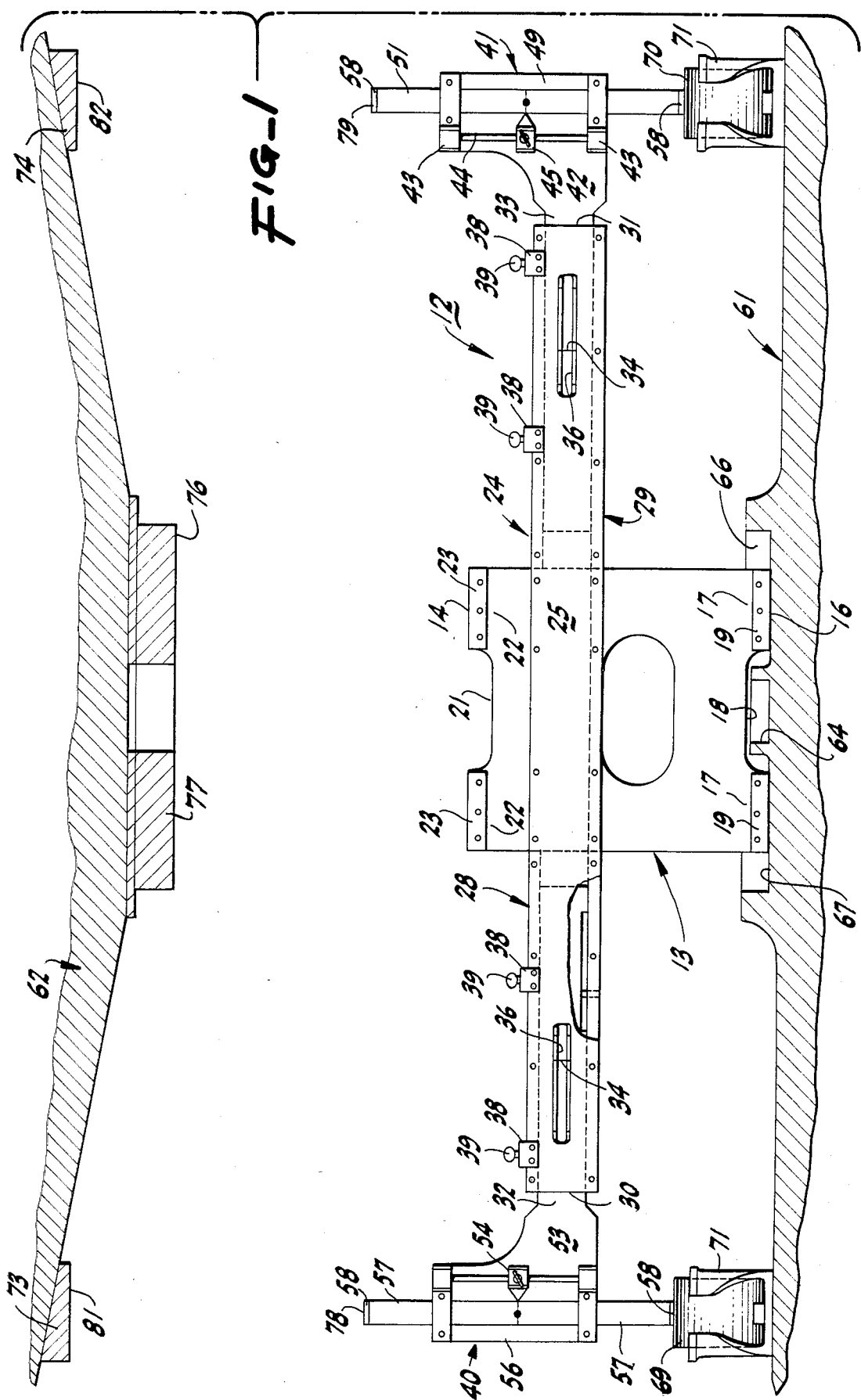

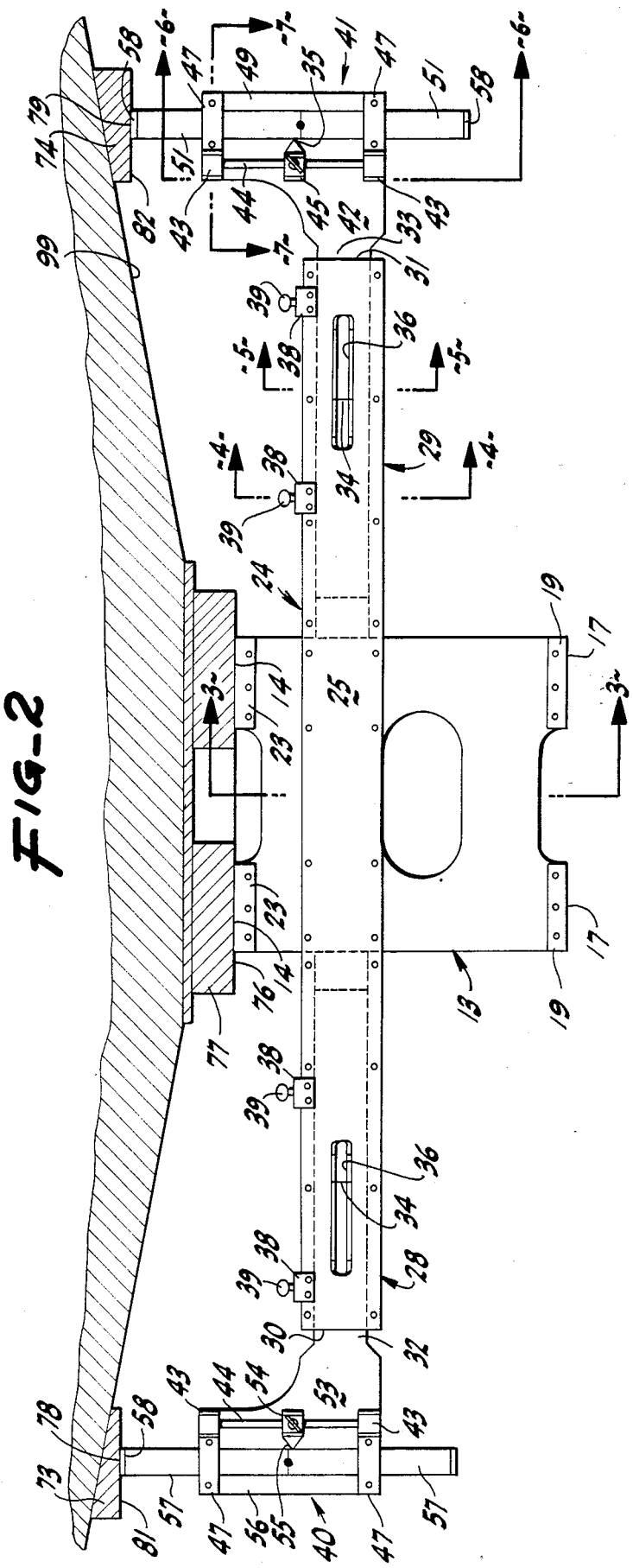

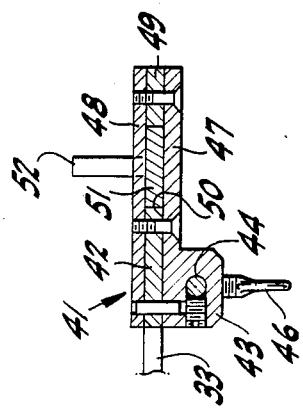
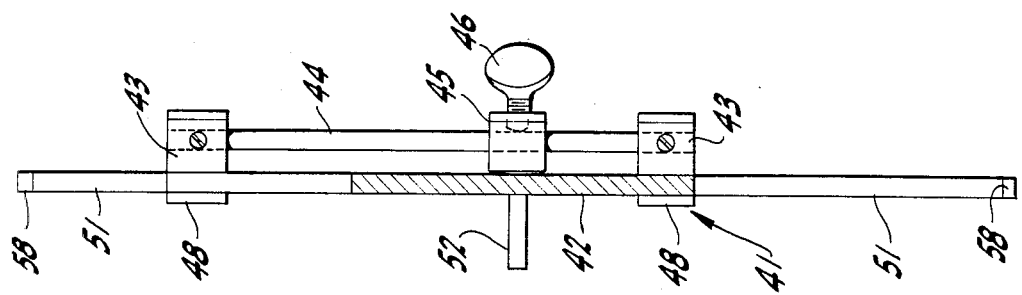
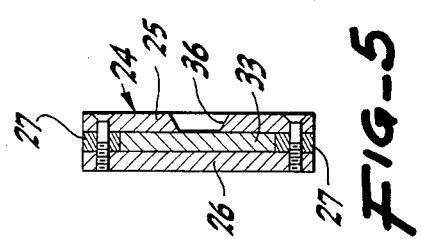
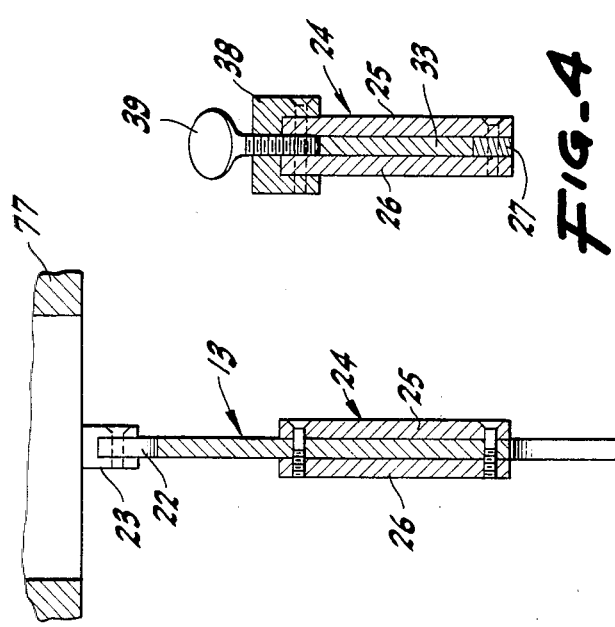
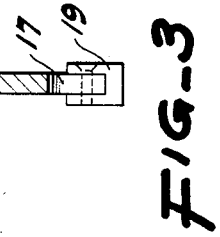

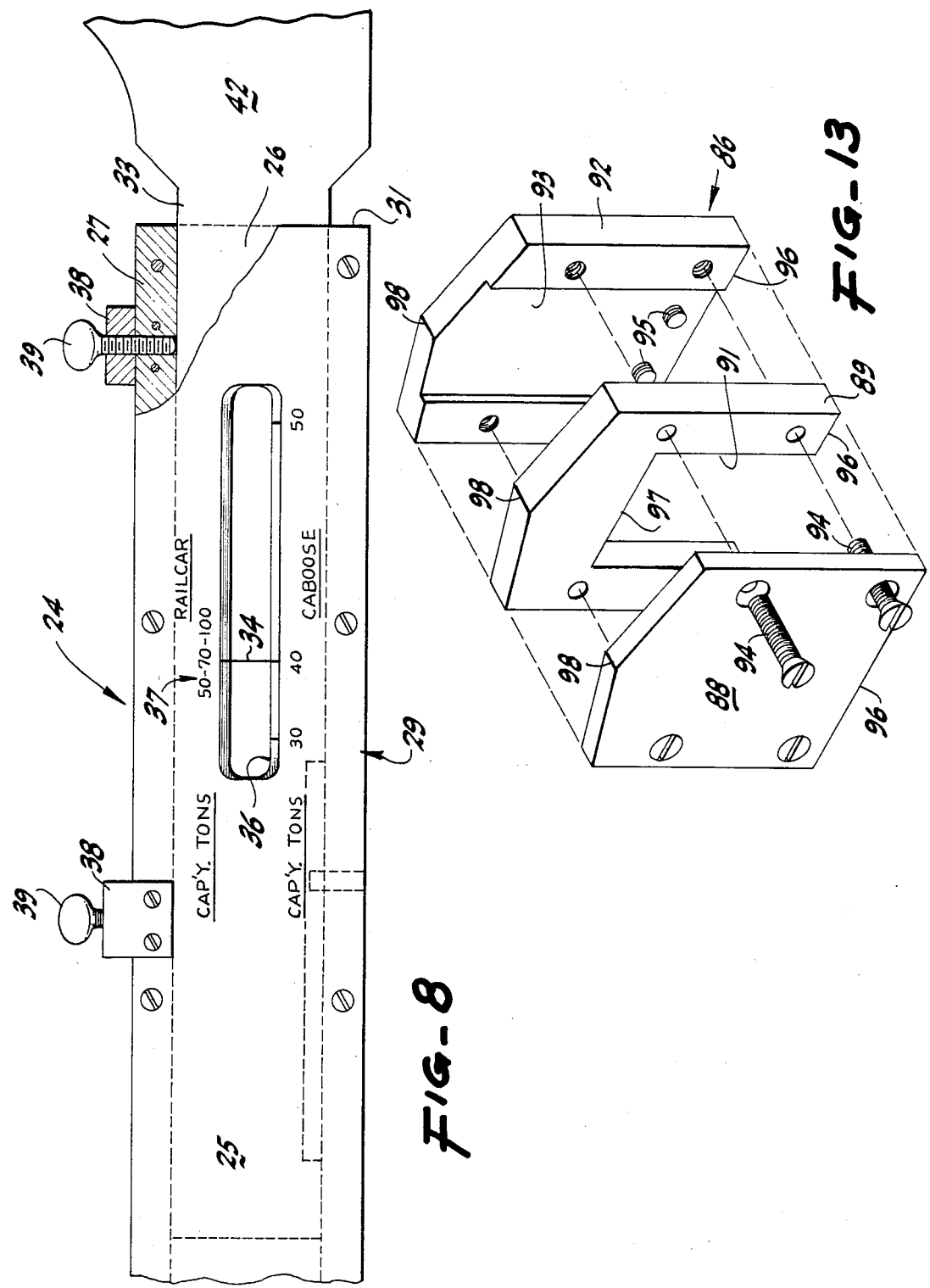

GAUGE FOR MEASURING CLEARANCE IN THE BODY SIDE BEARINGS OF RAIL CARS

BACKGROUND OF THE INVENTION

1. Field of the Invention

The invention relates to instruments for measuring the clearance between the body side bearings of rail cars and the subjacent truck side bearing rollers.

2. Description of the Prior Art

The Association of American Railroad's Interchange Rule 47, E.2.a. states in part that: "Side bearings must have 3/16 minimum to 5/16 inch maximum clearance."

As is well known in the railroad industry, the side bearings of the clearance type referred to in the Rule are elongated, fore and aft oriented, wedge-shaped-in-cross-section slabs of metal mounted on the bottom of the rail car body. There is one side bearing on each side of each of the car body center plates, each side bearing being located transversely from the center plate a predetermined distance such that when the body is lowered onto its trucks and the body center plates engage and are supported on the respective center plate bowls of the truck bolsters, the central zones of the body side bearings are ideally spaced 3/16 to 5/16 inch above the top of the respective subjacent truck side bearing rollers located in roller cages on the truck bolsters.

As the car body tilts from side to side for various reasons, such as going around a curve in the track, the body side bearings on the lower side of the tilt engage and are temporarily supported by the subjacent truck side bearing rollers.

If the maximum specified clearance of 5/16" is exceeded, the needed support is not provided at the appropriate juncture and the car can tilt to an unwanted degree. If, on the other hand, there is less than the minimum specified clearance, an excessive load is imposed upon the underlying roller and the center plate is tilted upwardly out of full engagement with the center plate bowl, thereby creating a high derailment risk.

Clearance measurements and adjustments are made periodically to minimize these undesirable consequences. Once the clearance of the body side bearings is determined and is found to be outside the specified range of 3/16" to 5/16", correction is made by adding or removing shims, or by changing the existing roller to another roller having a diameter such as to achieve the specified clearance.

Heretofore, various types of gauges have been employed to determine the extent of the clearance.

An early type was a device called a step gauge in which an elongated bar was cut with stepped increments. The step gauge is now rarely, if ever, used.

A widely-used, more recent type of measuring device has been the Pratt-Whitney No. 713 lateral gauge. The lateral gauge, for greatest accuracy, requires that the rail track be level, that the rail car body be perfectly balanced on its truck bolsters and that there be no twist in the car super-structure. Unfortunately, these ideal conditions rarely exist. Thus, even the most careful and conscientious craftsman, using the lateral gauge, will often find that when the rail car with corrected clearance is moved to another location the clearance is again found to be outside the specified range and the entire procedure of shimming etc. must be repeated.

The present gauge operates on a different principle from that of the lateral gauge and marks an improvement of a whole order over previous clearance gauges.

A preliminary search was made for gauges of the present type and the following U.S. patents were revealed:

| Bourgeois | 1,509,703 | 9/23/1924 |
| Brienza | 1,863,236 | 6/14/1932 |
| Komstadius | 3,158,941 | 12/01/1964 |
| Colby | 4,321,754 | 3/30/1982 |

Copies of these four patents are enclosed, herewith.

Of these four patents, only Brienza and Komstadius show a structural similarity to the present device; but neither of these patents discloses an instrument which first measures "down" against three linear surfaces and then measures "up" against three linear surfaces to establish the extent of clearance between the registering surfaces located at the opposite extremities of the instrument, as does the present gauge.

SUMMARY OF THE INVENTION

In order to measure the clearance between the bottom surface of the body side bearings of a rail car and the subjacent top surface of the truck side bearing rollers on the opposite lateral sides of a truck bolster, a gauge is provided. The gauge includes a central vertical frame having a horizontal cross beam carrying on each of its outer extremities a vertically movable graduated blade. For some types of measurements, a floating index pointer and a missing side bearing adapter are used; and, in order to add to its versatility, the opposite ends of the cross beam limbs include telescoping arms capable of positioning the graduated blades in the locations required by different kinds and sizes of rail cars and cabooses.

BRIEF DESCRIPTION OF THE FIGURES OF THE DRAWING

FIG. 1 is a front elevational view of the gauge in "down" position, with the lower end of the vertically positioned frame in face to face engagement with the upper surface of the center plate bowl of the truck bolster and with the lower ends of the graduated blades touching the respective tops of the truck side bearing rollers;

FIG. 2 is a front elevational view of the gauge in "up" position, with the upper end of the vertical frame in face to face engagement with the lower surface of the body center plate and with the upper ends of the graduated blades adjusted so as to touch the central portion of the bottom surfaces of the body side bearings;

FIG. 3 is a vertical sectional view, to an enlarged scale, of the frame, the plane of the section being indicated by the line 3—3 in FIG. 2;

FIG. 4 is a vertical sectional view, to an enlarged scale, of the right-hand limb of the cross beam, the right-hand telescoping arm and attendant thumb screw clamp, the plane of the section being indicated by the line 4—4 in FIG. 2;

FIG. 5 is a vertical sectional view, similar to that of FIG. 4, but showing the structure of the front window in the limb through which the indicator line on the telescoping arm can be seen, the plane of the section being indicated by the line 5—5 in FIG. 2;

FIG. 6 is a fragmentary vertical sectional view, to an enlarged scale, showing the right-hand gauge head including the graduated blade and the vertically slidable pointer, the plane of the section being indicated by the line 6—6 in FIG. 2;

FIG. 7 is a fragmentary horizontal sectional view, to an enlarged scale, the plane of the section being indicated by the line 7—7 in FIG. 2;

FIG. 8 is a fragmentary front elevational view, to an enlarged scale, of the window portion of the right-hand limb, with the telescoping arm adjusted to the proper position for the car being gauged and with a portion of the front bar broken away to reveal underlying structure;

FIG. 13 is an exploded perspective view, to an enlarged scale, showing the missing side bearing adapter preparatory to being placed in the appropriate position on the graduated blade for securement thereto by set screws;

DESCRIPTION OF PREFERRED EMBODIMENT

Figure 11:
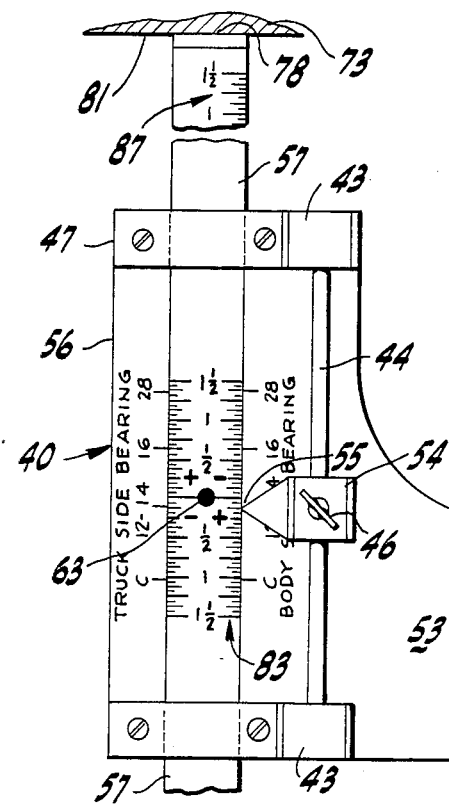
FIG. 11 is a front elevational view, to an enlarged scale, showing the left-hand graduated blade in "up" position as in FIG. 2.

Although the gauge of the invention is susceptible of numerous different embodiments, depending upon the environment and requirements of use, several of the herein shown and described embodiments have been made and used with eminently successful results.

The instrument of the invention, generally designated by the reference numeral 12, includes a plate-like main central body 13, or frame, preferably constructed of clear anodized aluminum, extending from an upper end 14 to a lower end 16 when the frame is in vertical attitude, as best appears in FIGS. 1 and 2.

The lower end 16 of the frame has a central portion removed to afford a pair of feet 17 separated by an opening 18. To resist wear, the feet 17 are covered with hardened steel shoes 19.

In comparable manner, the upper end 14 of the frame is formed with a central opening 21 straddled by a pair of shoulders 22 made wear-resistant by hardened steel covers 23.

Mounted by suitable fastenings on the vertical frame 13 is a horizontal cross beam 24 including a front bar 25 and a rear bar 26, as shown in FIG. 3.

The cross beam 24, comprising the two spaced apart bars 25 and 26, provides a left-hand limb 28 and a right-hand limb 29 terminating in respective opposite ends 30 and 31. As appears most clearly in FIGS. 4 and 5, a first pair of horizontal, vertically separated, parallel spacers 27 located between the bars 25 and 26 extends between the left-hand edge of the frame 13 and the left-hand end 30 of the limb 28 and a second pair of spacers 27 extends in mirror image fashion between the right-hand edge of the frame 13 and the right-hand end 31 of the limb 29.

Suitable fastenings, such as screws, as illustrated in FIG. 5, secure the front bars 25 to the spacers 27 and the rear bars 26, forming a horizontal channel within each of the limbs 28 and 29.

In order to increase the versatility of the gauge 12 for use with rail cars of different sizes, the channels in the limbs 28 and 29 are constructed so as to receive snugly, in telescoping relation, a respective pair of arms 32 and 33. The arms 32 and 33 translate in the channels defined by the front bar 25, the rear bar 26 and the spacers 27 forming the limbs 28 and 29 of the cross-beam 24.

Vertical lines 34 inscribed on the telescoping arms 32 and 33 are visible through windows 36 in the front bar 25 of the hollow limbs 28 and 29; and indices 37 on the limbs 28 and 29 adjacent the windows 36 point out the extent to which the arms are to be extended for certain rail car types. Brackets 38 and thumb screws 39 serve to secure the arms in selected proper position (see FIG. 4). Loosening the thumb screws 39 allow the arms to move; tightening the thumb screws clamps the arms.

On the outer extremities of the left-hand telescoping arm 32 and the right-hand telescoping arm 33 are respective gauge heads 40 and 41.

As appears best in FIGS. 1, 2, 6 and 7, the right-hand gauge head 41 includes an enlarged vertical panel portion 42. Mounted on the upper and lower ends of the panel 42 is a pair of brackets 43 between which is located a vertical rod 44 guiding a vertically positionable pointer 45, with a tip 35, selectively positioned on the rod by a thumb screw 46.

The brackets 43 include horizontal tongues 47 extending beyond the panel 42. The tongues 47, in conjunction with spaced parallel backing plates 48 and a vertical spacer 49, are all held together by suitable fasteners, and form a pair of vertically aligned channels 50 in which is slidably, but snugly, disposed a graduated vertical blade 51 with a rearwardly projecting pin 52 to assist the user's hand in vertically positioning the blade 51.

The left-hand gauge head 40 is provided, in mirror image, or mirror symmetry, with elements indentical to those just described in connection with the right-hand gauge-head 41. The left-hand gauge head 40 includes, for example, a vertically enlarged panel 53, a pointer 54 with tip 55, a vertical spacer 56 and a graduated blade 57.

In order to increase resistance to wear, the upper and lower ends of the left-hand blade 57 and the right-hand blade 51 are provided with tips 58 of hardened tool steel.

In operation, having determined the kind of rail car to be gauged, the thumb screws 39 on all four of the brackets 38 are loosened and the arms 32 and 33 are translated in or out until the vertical lines 34 scribed on the arms are visible through the windows 36 and are indexed to the appropriate one of the indicia 37 scribed on the respective limbs 28 and 29 of the cross beam 24. The thumb screws 39 are then tightened.

As an example, FIG. 8 illustrates the placement of the arms 32 and 33 to accommodate either a 40 Ton caboose or 50-70 and 100 Ton railcars (all of which have a 50 inch center to center transverse spacing between body side bearings). In Case of 30 Ton cabooses, the spacing is 48 inches; and 50 Ton cabooses have a center to center distance of 56 inches.

Having established the proper spacing of 50 inches between the left-hand blade 57 and the right-hand blade 51 for, say, a 50 Ton railcar, as shown in FIG. 8, the gauge of the invention 12 is placed on a truck bolster 61 in the manner illustrated in FIG. 1.

As will be appreciated, the car body 62 of which the lower portion is shown diagrammatically in FIG. 1 will previously have been lifted off the subjacent, supporting truck bolster 61, removed to another location and mounted temporarily on suitable supports so that the bottom of the car body 62, and more particularly, the body center plate and the body side bearings, are readily accessible to the user of the present gauge.

When the car body is lifted off the subjacent two (forward and after) trucks, and is moved to another location, the orientation of the body is maintained so that the BL and BR body side bearings, for example, are arranged in the same orientation as the respective BL and BR truck side bearings (i.e. the side bearing rollers).

In railroad terminology, BL and BR refer to the left and right lateral sides of the car when facing the brake end of the car, whereas AL and AR refer to the left and right sides of the opposite end of the car.

After the arms 32 and 33 are properly positioned and clamped, the gauge 12 is placed on one of the truck bolsters 61 with the graduations and scales facing the outboard axle of the truck. The frame 13 is placed in vertical attitude as shown in FIG. 1, with the hardened shoes 19 on the bifurcated lower end 16 of the frame 13 disposed on opposite sides of the hollow central boss 64 of the center plate bowl 66. The bottom of the hardened shoes 19 must engage the upwardly facing surface 67 of the bowl 66 in face to face relation.

The gauge 12 is oriented so that the horizontal cross beam 24 is parallel to the longitudinal axis of the elongated truck bolster 61. The longitudinal axis of the truck bolster is transverse to the fore and aft direction of the car body and of the rails on which the trucks move.

In well-known manner, which requires no further description, a left-hand side bearing roller 69 and a right-hand side bearing roller 70, as in FIG. 1, are confined in roller cages 71 mounted on the truck bolster 61 adjacent the opposite ends thereof. The rollers 69 and 70 are right circular cylinders constructed of metal, such as iron, and their axes are parallel to the longitudinal axis of the truck bolster. The roller cages afford some play for the confined rollers in a fore and aft direction. Thus, the roller, when engaged by the overlying body side bearing, can roll fore or aft, within limits, thereby affording a degree of relative fore and aft motion between the body and the truck (when rounding a bend in the track, for example) even while a heavy load is being superimposed by the side bearing of the tilted body on the subjacent roller. The bottoms of the cages are V-shaped, tending at all times to urge the roller toward the bottom of the V.

After the gauge frame 13 is properly placed on the truck bolster center plate bowl 66 and the two gauge heads 40 and 41 are located above the respective side bearing rollers 69 and 70, the respective graduated blades 57 and 51 are positioned to rest on top of the side bearing rollers 69 and 70.

The two pointers 54 and 45 are then located so that the respective tips 55 and 35 point toward the respective adjacent central dots 63 and 65. After the pointers 54 and 45 are secured by tightening the pointer thumb screws 46, the instrument is ready to gauge the respective body side bearings 73 and 74.

With particular reference to FIGS. 9 to 12, it should be noted that the overall gauge 12 is dimensioned so that a 5/16 inch clearance is "built into" the instrument. That is to say, in a preferred embodiment of the gauge presently in use, the frame 13, or main central body, of the gauge, vertically measures 12-15/16 inches between top 14 and bottom 16; while the graduated blades 57 and 51 each vertically measures 13¼ inches. The difference is 5/16 inches. Thus, regardless of where the graduated blades are positioned, the vertical measurement from the top 14 of the frame 13 to the top of the graduated blades 57 and 51 will always be 5/16 inch more than the vertical measurement from the bottom 16 of the frame 13 to the bottom of the graduated blades 57 and 51. This "built-in" clearance of 5/16 inch conveniently provides the gauge operator with a time-saving advantage, as will subsequently be described in more detail.

After the pointers 54 and 45, or "floating" indices, have been secured in the correct positions, pointing toward the respective central dots 63 and 65, the instrument is shifted to "up" position against the underside of the rail car body, usually located a few feet away from the respective truck which has just been gauged.

The graduations and scales are oriented so that they face the appropriate end of the car. By facing the graduations and scales toward the outboard axle when gauging the truck, as mentioned above, and similarly facing the respective end of the car when gauging the body side bearings, it insures that the BL pointer 54 setting is matched with the BL body side bearing 73 and the BR pointer 45 setting is matched with the BR body side bearing 74.

With the upper bifurcated end 14 of the frame 13 engaging the downwardly facing surface 76 of the center plate 77 in face to face relation, the graduated blades are moved up or down, if necessary, until the respective upper ends 78 and 79 of the graduated blades 57 and 51 touch the respective undersides 81 and 82, or downwardly facing surfaces, of the body side bearings 73 and 74.

Referring to FIG. 11, showing a BL body side bearing reading it can be seen that the tip 55 of the pointer 54 points to plus ⅛ inch on the left-hand side bearing scale 83. This means that a ⅛ inch shim should be placed under the BL body side bearing 73 to obtain a 5/16 inch clearance. The actual clearance before making any adjustment is the "built-in" 5/16 inch clearance plus ⅛ inch or 7/16 inch total clearance, which exceeds the AAR Rule maximum of 5/16 inch.

There is an alternative choice for making the side bearing adjustment at this location; namely, instead of adding a ⅛ inch shim to acquire the desired clearance of 5/16 inch, a side bearing roller ⅛ inch larger in diameter than the present roller can be substituted for the present roller.

Figure 12:
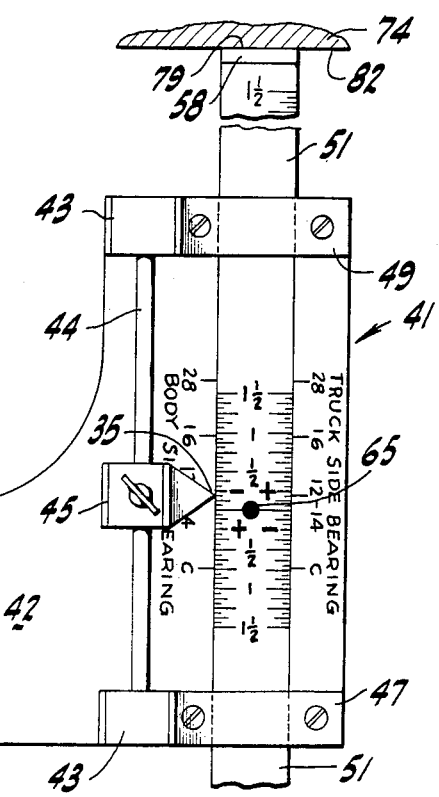
FIG. 12 is a front elevational view, to an enlarged scale, showing the right-hand graduated blade in "up" position as in FIG. 2.
Figure 9:
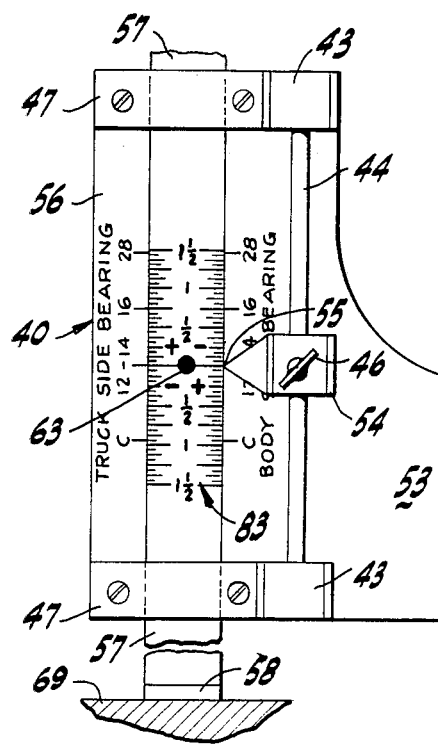
FIG. 9 is a front elevational view, to an enlarged scale, showing the left-hand graduated blade in "down" position as in FIG. 1.

With reference to FIG. 12, a BR body side bearing reading is illustrated. The tip 35 of the pointer 45 reads minus 3/16 inch, which means that a 3/16 inch shim must be removed to obtain the desired 5/16 inch at the BR body side bearing.

The actual clearance before making any adjustment is 5/16 inch minus 3/16 inch or ⅛ inch clearance, less than the Rule minimum 3/16 inch.

There is a second choice for making this BR side bearing adjustment. Instead of removing a 3/16 inch shim to achieve 5/16 inch clearance, the diameter of the respective side bearing roller can be measured. The present roller can be replaced by a roller which is 3/16 inch less in diameter, thereby obtaining the same results, and saving labor and material.

In some cases, body side bearings are missing. In these cases it is time consuming to install a temporary body side bearing and set the body on its trucks to determine how to shim in order to acquire a 5/16 inch clearance.

Instead, the gauge of the present invention provides, for each gauge head 40 and 41, a missing side bearing adapter 86 and associated missing side bearing scale 87. Each of the missing side bearing adapters 86 is identical to the other and thus a description of one will serve equally to describe the other. The construction of the missing side bearing adapter 86 appears most clearly in the partially exploded perspective view, FIG. 13.

The adapter 86 includes a front plate 88, a middle plate 89 formed with an opening 91 to receive the upper end of the blade 51, for example, and a back plate 92 having a vertical recess 93. The lower portion of the recess 93 coincides with the opening 91 in the middle plate 89 and the upper portion is open to the atmosphere to afford a vent when the adapter 86 is located on and removed from the upper end of the blade 51. Fasteners 94 secure the plates together and small machine screws 95 projecting through openings in the lower wall portion of the back plate 92 serve to clamp the adapter 86 at any desired location on the blade. The machine screws 95 are of the type which can be moved toward or away from the blade by manipulation from the nether side of the back plate 92 and can be of the allen set-screw type, if desired.

A typical example disclosing the manner of using the adapter 86 and scale 87 will now be given.

Assuming the car being gauged is a 70 ton flat car and is missing a body side bearing, the appropriate side bearing to be applied is ⅝ inch thick. By using the missing side bearing adapter, however, it is not necessary to install a new body side bearing temporarily, followed by setting the body on its trucks and gauging to determine how to shim, or replace rollers, to obtain 5/16 inch clearance.

Figure 14:
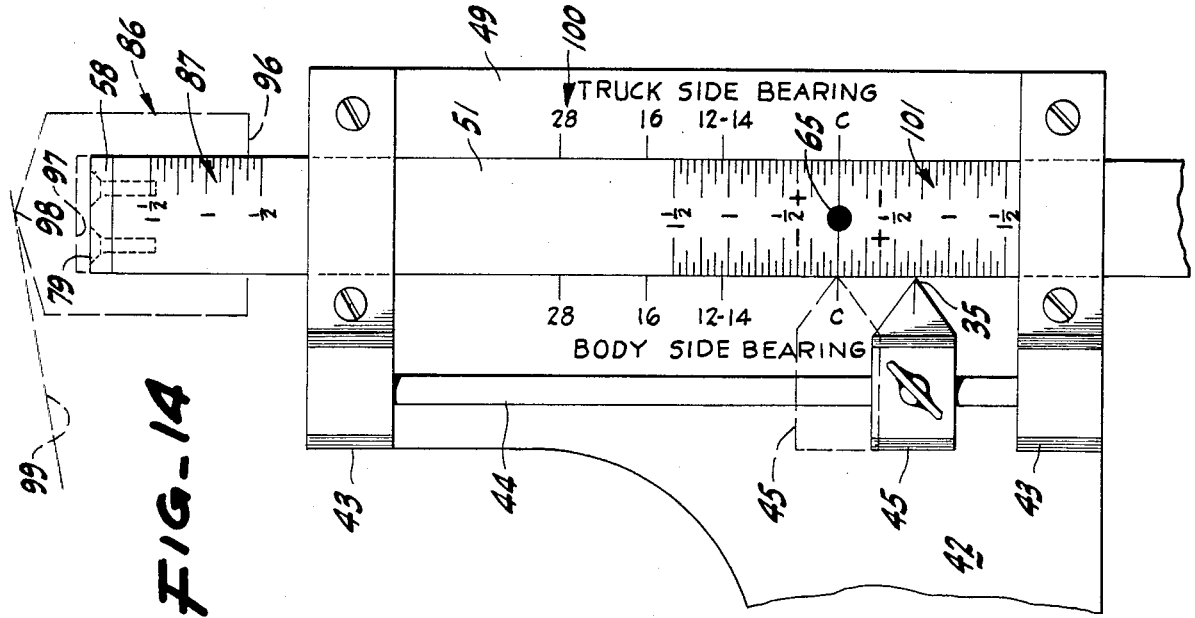
FIG. 14 is a front elevational view, to an enlarged scale, showing a missing side bearing adapter, in broken line, on the upper end of the right-hand blade, and showing the associated adapter scale when the gauge is in "up" position with the frame against the lower surface of the body center plate and the right-hand missing side bearing adapter touching the body bolster bottom cover plate at the BR side bearing location of the missing side bearing.

Instead, the right hand one of the missing side bearing adapters 86 is placed on the upper end of the blade 51 so that the lower margin 96 of the adapter is at ⅝ inch on the missing side bearing adapter scale 87, as appears in broken line in FIG. 14. The adapter 86 is clamped in place by screwing in the set screws 95.

Figure 10:
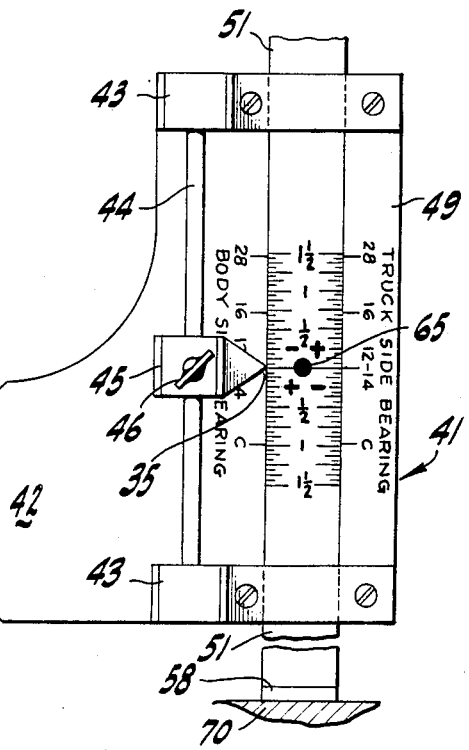
FIG. 10 is a front elevational view, to an enlarged scale, showing the right-hand graduated blade in "down" position as in FIG. 1.

The gauge 12 is then located in "down" position on the truck as before, and, as in FIG. 10, and in broken line in FIG. 14, the tip 35 of the pointer 45 is set to the respective dot 65 on the right-hand blade 51.

Since the dimensions of the adapter 86 are such that the distance between the upper end 97 of the opening 91 in the middle plate 89 and the peak 98 of the adapter 86 is ½ inch, any space separating the upper end 79 of the blade 51 and the upper end 97 of the opening 91 increases the effective height of the blade 51 by an amount equal to ½ inch plus the height of said space.

Thus, in the location of the adapter 86 shown in FIG. 14, the effective height of the blade 51 is effectively increased by ⅝ inch, thereby taking into account the thickness of the missing side bearing.

Figure 16:
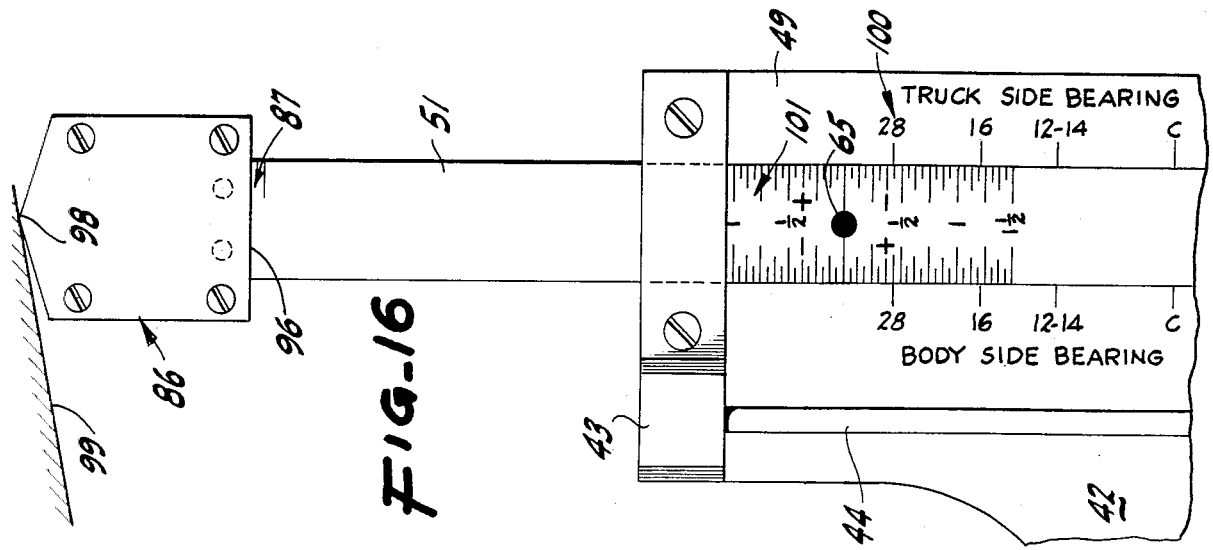

Consequently, when the gauge is moved to "up" position, as in FIG. 16, with the blade 51 elevated so that the peak 98 of the adapter 86 touches the body bolster bottom cover plate 99 (in lieu of the right-hand body side bearing 74 shown in FIG. 2), the result is the same as if the body side bearing were not missing.

Thus, when the blade 51 has to be elevated by 11/16 inch, in order for the peak 98 of the adapter to touch the bottom cover plate 99 of the body bolster, as indicated by the tip 35 of the pointer 45 shown in full line in FIG. 14, the user knows that when the ⅝ inch thick side bearing is installed, it must have an 11/16 inch shim applied to obtain the desired 5/16 inch clearance.

Although the foregoing description of the missing side bearing compensation has referred in particular to the right-hand gauge head 41, it is to be understood that the same procedure is followed on the left-hand side of the gauge.

It would also be appropriate to point out at this juncture that the built in clearance of the gauge is 5/16 inch rather than 3/16 inch or any amount between 5/16 inch and 3/16 inch. Any of these would meet Interchange Rule 47 E.2, but it is deemed preferable to start with the maximum allowed clearance of 5/16 inch, since normal wear will progressively reduce the clearance until it becomes time to re-gauge and re-shim, if necessary.

Rail car repair and rehabilitation facilities often include separate truck and body plants. The present gauge can be used to great advantage in such plants.

As most clearly appears on the right-hand spacer 49 illustrated in FIG. 14, a Truck Side Bearing index 100 is inscribed. In conjunction with the index 100 is a Truck Side Bearing scale 101, located on the movable blade 51. The Truck Side Bearing scale 101 shares graduations with the Body Side Bearing scale, although opposite thereto in a plus or minus sense, as can be seen by reference to the respective plus and minus symbols on the graduations.

In using the Truck Side Bearing index 100 and scale 101, the pointer 45 is disregarded; and before starting to gauge, new side bearing rollers, 4 inches in diameter, must be placed in both of the side bearing roller cages 71.

The numeral "28" on the index 100 is used as a base for low profile trucks equipped with 28 inch diameter wheels. Thus, when the gauge is placed in "down" position, as in FIG. 1, and the blades 57 and 51 are lowered into contact with the respective subjacent new rollers 69 and 70, readings are taken of both the left-hand and the right-hand Truck Side Bearing scales at the numeral "28" on the index 100.

Figure 15:
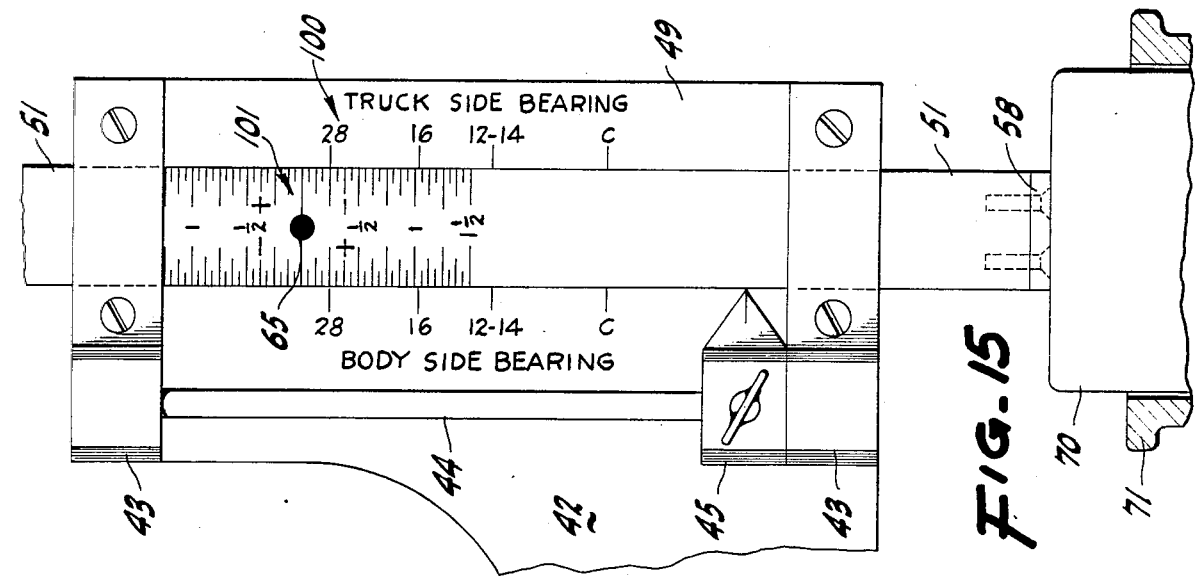
FIG. 15 is a front elevational view of the right-hand head of the gauge showing how a truck is gauged; and, FIG. 16 is a view similar to that of FIG. 15, showing how a body side bearing is gauged.

If the reading of the right-hand scale 101 were to be minus ¼ inch, as shown in FIG. 15, for example, it is merely necessary to find a used side bearing roller having a diameter of 3¾ inches (4 inches less ¼ inch) and substitute it for the new, 4 inch roller in the roller cage. The minus ¼ inch is a measure of the extent of variation from the normal difference in elevation between the top 58 of the side bearing roller 70 and the upward facing surface 67 of the center plate bowl, caused, for example, by wear of the surface 67. By changing to a 3¾ inch side bearing roller the normal difference in elevation for a specific truck size is restored.

The left-hand side is similarly gauged; and a substitution of a different side bearing roller is made, if necessary, in the manner previously described for the right-hand side.

In a comparable manner, when the extent of variation from the normal difference in elevation between the bottom surfaces of the body side bearings and the body center plate is to be determined and corrected, it is only necessary to place the gauge in "up" position, with the upper portion of the frame held in engagement with the downward facing surface 76 of the body center plate, as in FIG. 2.

For purposes of illustration, it will be assumed that the right hand body side bearing 74 is missing. In this case, a missing side bearing adapter is installed on top of the respective blade 51 with the bottom margin 96 of the adapter 86 positioned at the appropriate scale graduation on the blade, for example, ⅝ inch where the missing body side bearing is ⅝ inch thick, as appears most clearly in FIGS. 14 and 16.

Where the car is equipped with low profile trucks having 28 inch diameter wheels, the Body Side Bearing scale reading is made at the numeral "28". In the particular reading shown in FIG. 16, the scale shows a plus 7/16 inches measured from the base or circle 65. This means that by adding a 7/16 inch shim under the ⅝ inch thick side bearing to be installed, a 5/16 inch clearance will have been obtained at this location, relative to the previously adjusted truck roller, of 3¾ inch diameter, as described above.

In summary, by utilizing the Truck Side Bearing Index on the gauge to adjust side bearings (rollers) of trucks and utilizing the Body Side Bearing Index on the gauge to adjust and replace body side bearings of the cars on the repair tracks, the operational efficiency of the truck and body plants is enhanced and delays in trucking rail cars are minimized.

I claim:

1. Gauge for measuring clearance in the body side bearings of rail cars having a body center plate rotatably supported on the center plate bowl of a truck bolster including a pair of side bearing rollers positioned in closely spaced relation below the respective body side bearings for supporting engagement therewith as the car body tilts from side to side, said gauge comprising:
   a. a vertical frame having a lower end shaped for face to face engagement with the upward facing surface of the center plate bowl when the car body is separated from the truck bolster, and an upper end shaped for face to face engagement with the downward facing conjugate surface of the body center plate;
   b. a horizontal cross beam mounted on said frame and terminating at opposite ends located in the vicinity of the respective side bearing rollers when said lower end of said frame is in engagement with the upward facing surface of the center plate bowl and said frame is oriented so that said cross beam is in parallel relation to the longitudinal axis of the truck bolster;
   c. a pair of graduated blades each translatably mounted on a respective end of said cross beam for vertical movement between a first location in which the bottoms of said blades are in engagement with the top surfaces of the respective subjacent rollers when said lower end of said frame is in down position in engagement with the center plate bowl, and a second location with the tops of said blades in engagement with the bottom surfaces of the respective superjacent body side bearings when said upper end of said frame is in up position in engagement with the body center plate.

2. A gauge as in claim 1 including a pair of pointers on the respective ends of said cross beam in the vicinity of said graduated blades; means for vertically moving said pointers relative to the graduations on said blades; and means for selectively positioning each of said pointers at a predetermined graduation inscribed on a respective one of said blades when said gauge is in said down position and said blades are in said first location, said pointers remaining stationary when said gauge is transferred to said up position and said blades are moved to said second location, the resultant displacement of said blades relative to said pointers indicating the extent of clearance in the body side bearings.

3. A gauge is in claim 1 including a pair of horizontal arms; means for mounting said arms on opposite ends of said horizontal cross beam for telescoping movement toward and away from said vertical frame, said graduated blades being carried on the respective opposite outer ends of said arms.

4. A gauge as in claim 3 further including indicia on said arms and on said cross beam for indicating the extent of telescoping required to register said outer ends of said arms with the side bearing rollers of a rail car of a specific size.

5. A gauge as in claim 1 including a missing side bearing adapter comprising a block having a vertical recess shaped to receive the top of either of said blades; and means for positioning said block at a predetermined location on said blade in order to extend the effective length of said blade by an amount equal to the thickness of a respective missing body side bearing.

6. Gauge for a rail car truck bolster having a center plate bowl and a pair of side bearing rollers, said gauge comprising:
   a. an upright frame having a lower portion shaped for face to face engagement with the upward facing surface of the center plate bowl;
   b. a cross beam mounted on said frame and extending in opposite directions therefrom to terminate at opposite ends located in the vicinity of the respective side bearing rollers when said lower portion of said frame is in engagement with the upward facing surface of the center plate bowl and said frame is oriented so that said cross beam is in parallel relation to the longitudinal axis of the truck bolster;
   c. a pair of graduated blades each translatably mounted on said opposite ends of said cross beam for movement toward and away from the subjacent one of said side bearing rollers; and,
   d. indicia on said blades and on an adjacent portion of said ends of said cross beam for indicating the extent of variation from the normal difference in elevation between the side bearing rollers and the upward facing surface of the center plate bowl of a truck bolster of a specific size.

7. Gauge for a rail car body having a body center plate and a pair of side bearings, said gauge comprising:
   a. an upright frame having an upper portion shaped for face to face engagement with the downward facing surface of the body center plate;
   b. a cross beam mounted on said frame and extending in opposite directions therefrom to terminate at opposite ends located in the vicinity of the respective body side bearings when said upper portion of said frame is in engagement with the downward facing surface of the body center plate and said frame is oriented transverse to the fore and aft axis of the rail car body;
c. a pair of graduated blades each translatably mounted on opposite ends of said cross beam for movement toward and away from the superjacent one of said body side bearings; and,
d. indicia on said blades and on an adjacent portion of said ends of said cross beam for indicating the extent of variation from the normal difference in elevation between the body side bearings and the downward facing surface of the body center plate of a rail car body of a specific size.

8. Gauge for a rail car body as in claim 7 including a missing side bearing adapter comprising a block having a vertical recess shaped to receive the top of either of said blades, and means for positioning said block at a predetermined location on said blade in order to extend the effective length of said blade by an amount equal to the thickness of a respective missing body side bearing.

* * * * *